United States Patent
Totsuka et al.

(10) Patent No.: US 7,134,682 B2
(45) Date of Patent: Nov. 14, 2006

(54) OCCUPANT RESTRAINT SYSTEM

(75) Inventors: Hirofumi Totsuka, Wako (JP); Takashi Aoki, Wako (JP); Hidetoshi Utsumi, Wako (JP); Naoki Takemura, Wako (JP); Yuichi Saito, Tochigi (JP)

(73) Assignee: Hondo Motor Co., Ltd., Tokyo (JP)

( * ) Notice: Subject to any disclaimer, the term of this patent is extended or adjusted under 35 U.S.C. 154(b) by 352 days.

(21) Appl. No.: 10/742,576

(22) Filed: Dec. 19, 2003

(65) Prior Publication Data

US 2004/0178609 A1  Sep. 16, 2004

(30) Foreign Application Priority Data

Dec. 20, 2002  (JP) ............... P. 2002-370260

(51) Int. Cl.
  *B60R 21/16*  (2006.01)
(52) U.S. Cl. ................. 280/728.2; 280/730.2
(58) Field of Classification Search ............ 280/730.2, 280/728.2, 728.1, 743.1
  See application file for complete search history.

(56) References Cited

U.S. PATENT DOCUMENTS 6,672,027 B1 * 1/2004 Mizutani et al. ........... 52/716.5
6,863,300 B1 * 3/2005 Ryu ........................ 280/730.2
2004/0108694 A1 * 6/2004 Takahashi ................ 280/730.2

FOREIGN PATENT DOCUMENTS

| JP | 2001-039260 | 2/2001 |
|----|-------------|--------|
| JP | 2002-059802 | 2/2002 |
| JP | 2002-249014 | 9/2002 |
| JP | 2002-347554 | 12/2002 |

* cited by examiner

*Primary Examiner*—Paul N. Dickson
*Assistant Examiner*—Drew J. Brown
(74) *Attorney, Agent, or Firm*—Carrier, Blackman & Associates, P.C.; William D. Blackman; Joseph P. Carrier (57) ABSTRACT

An occupant restraint system includes an air bag arranged inside a roof side rail in a folded state. When a vehicle is involved in a collision, the air bag so arranged is inflated with a gas generated by an inflator so as to be deployed along an inner surface of a side portion of a passenger compartment in a curtain-like fashion. In a pillar garnish which covers a side of a pillar inner of a B pillar which faces a passenger compartment side, a rod-like projection provided on an inner surface of the pillar garnish at an upper portion thereof in such a manner as to project therefrom is inserted into a hole formed in the pillar inner. Even in case the air bag which is being deployed pushes against an upper end of the pillar garnish, the dislocation of the pillar garnish from the pillar inner is prevented.

11 Claims, 7 Drawing Sheets

OCCUPANT RESTRAINT SYSTEM

BACKGROUND OF THE INVENTION

1. Field of the Invention

The present invention relates to an occupant restraint system in which an air bag in a folded state is arranged in such a manner as to extend along a side portion of a roof, so that, when a vehicle is involved in a collision, the air bag is inflated with a gas generated by an inflator so as to be deployed in a curtain-like fashion along an inner surface of a side portion of a passenger compartment.

2. Description of the Related Art

The occupant restraint system is known by JP-A-2001-39260. In this occupant restraint system, when the folded air bag arranged in such a manner as to extend along the side portion of the roof is deployed downwardly along a center pillar (a B pillar), the air bag may be caught at an upper end of the pillar garnish which covers the side of the center pillar which faces the passenger compartment, and the pillar garnish is dislocated from the center pillar, whereby the smooth deployment of the air bag is interrupted. In order to prevent this, straps on bridges formed on an inner surface of the pillar garnish are locked at first ends thereof to upper and lower ends of the pillar garnish and are fixed at the other ends thereof to a vehicle body side with bolts.

Incidentally, with the related-art occupant restraint system, the complex construction of the bridge on the pillar garnish has not only made the mold for the pillar garnish expensive to thereby cause a problem that the production costs are increased, but has also required special components such as the straps and bolts to thereby cause a problem that the number of components is increased.

SUMMARY OF THE INVENTION

The invention was made in view of these situations, and an object thereof is to provide an occupant restraint system which can prevent the dislocation of the pillar garnish when the air bag is deployed with a simple construction which does not call for an increase in the number of components.

With a view to attaining the object, according to a first aspect of the invention, there is proposed an occupant restraint system comprising:

an air bag in a folded state being arranged in such a manner as to extend along a side portion of a roof, the air bag being inflated with a gas generated by an inflator so as to be deployed in a curtain-like fashion along an inner surface of a side portion of a passenger compartment when a vehicle is involved in a collision; and a pillar garnish covering a side of a pillar continuously extending downwardly from the side portion of the roof which faces the passenger compartment, the pillar garnish including a rod shaped projection which is formed on an inner surface of the pillar garnish, the projection having a distal end adapted to be inserted in a hole formed in the pillar.

The projection may be integrally formed on the inner surface of the pillar garnish.

According to the construction, even in case the deploying air bag is caught at an upper end of the pillar garnish, which covers the pillar when the air bag which is arranged in such a manner as to extend along the side portion of the roof in the folded state is inflated so as to be deployed along the side of the pillar which faces the passenger compartment, by causing the distal end of the projection integrally formed on the inner surface of the pillar garnish to be inserted in the hole formed in the pillar, the dislocation of the pillar garnish from the pillar is prevented to thereby enable the smooth deployment of the air bag. In addition, since the rod-like projection is formed into a simple shape when compared with a clip or a hook, the projection is easy to be molded, whereby an increase in the production costs of the pillar garnish can be suppressed to a minimum level. Moreover, since no special separate member is required, there is caused no risk that the number of components is increased.

Note that a B pillar 15 in an embodiment of the invention corresponds to the pillar of the invention.

DETAILED DESCRIPTION OF THE INVENTION

A mode for carrying out the invention will be described below based on an embodiment of the invention which is illustrated in the accompanying drawings.

Figure 1:
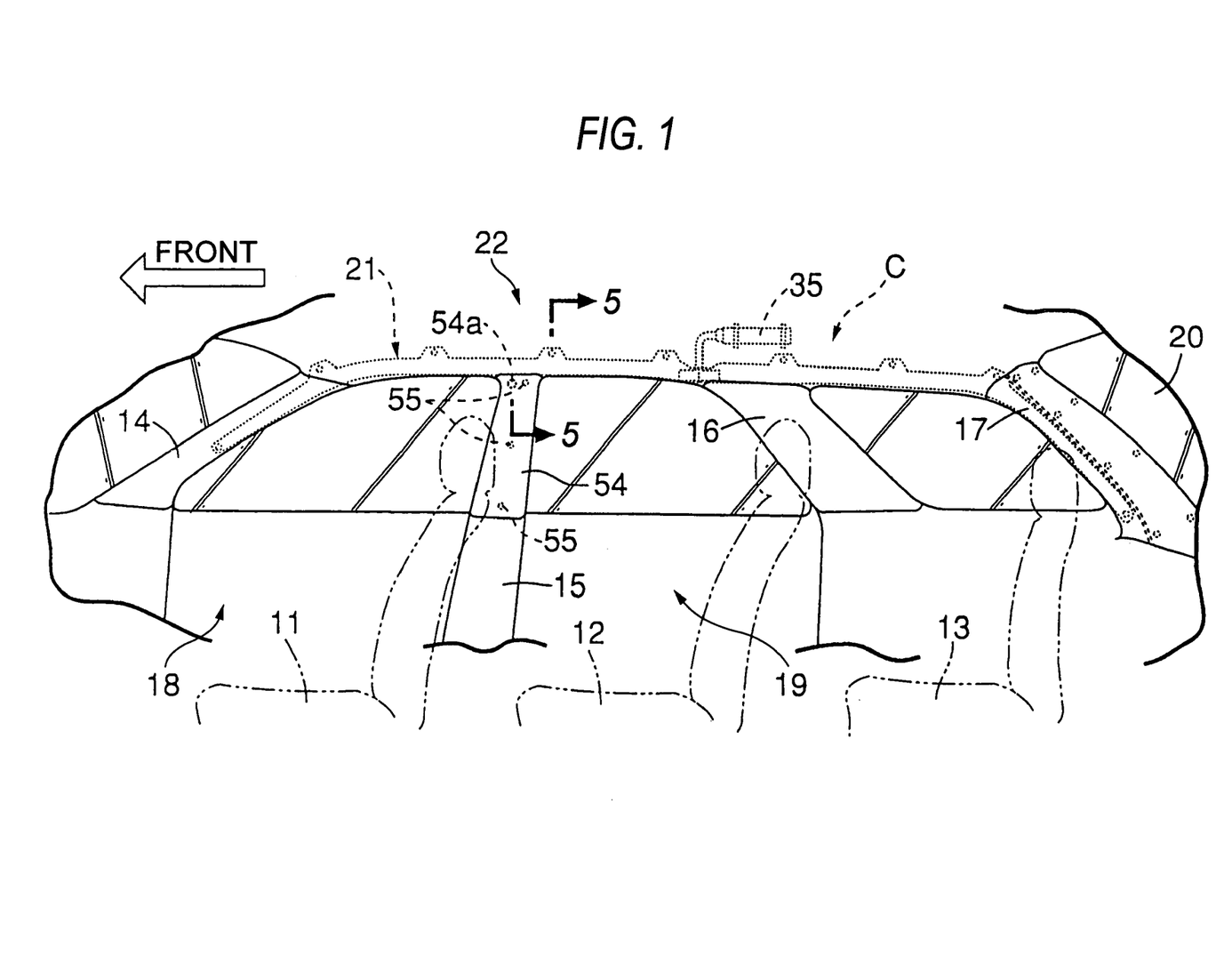
FIG. 1 is a drawing showing an inside of a passenger compartment of a vehicle when an air bag is in a non-deployed state.
Figure 2:
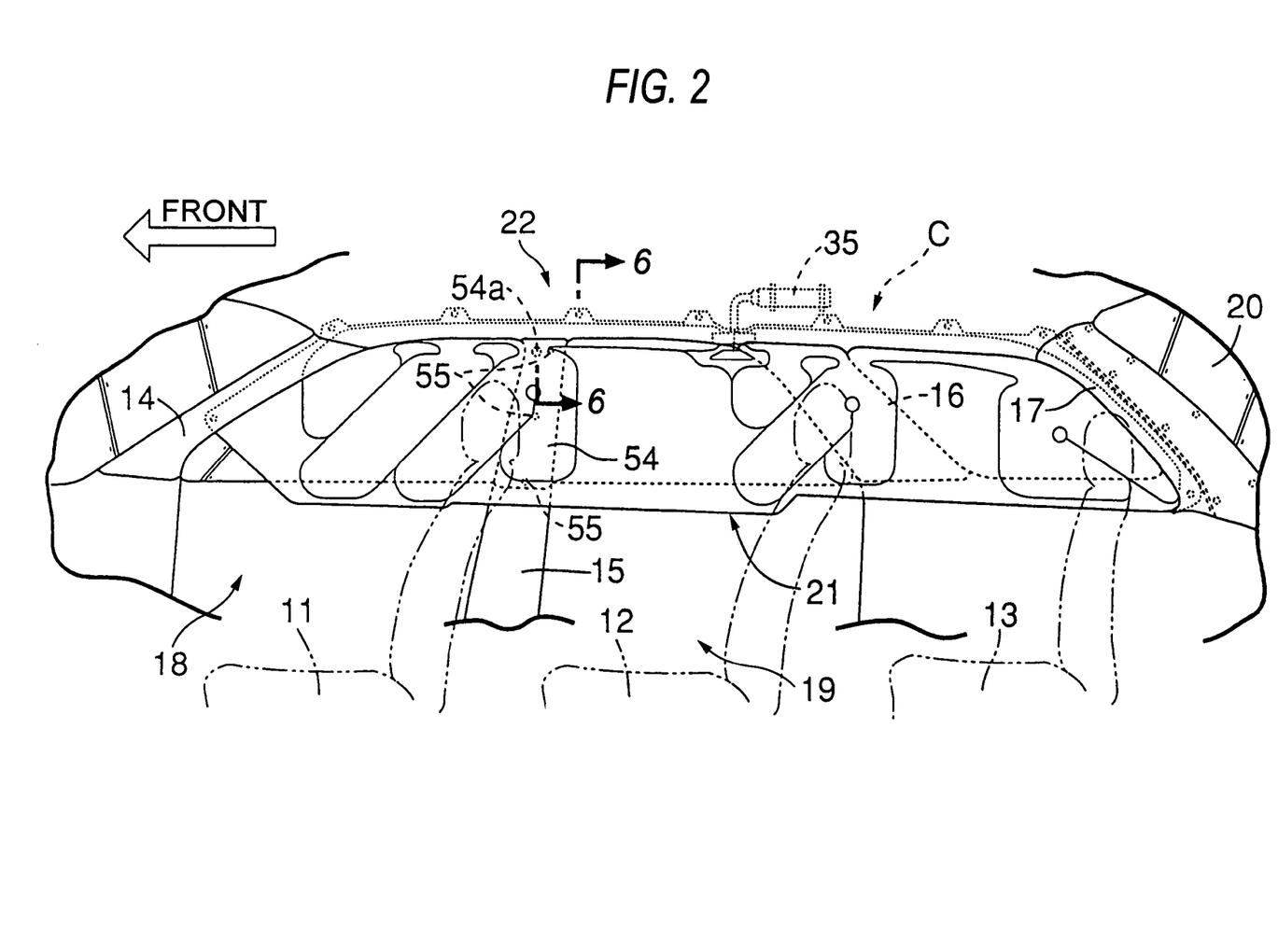
FIG. 2 is a drawing showing the inside of the passenger compartment of the vehicle when the air bag has been deployed.
Figure 3:
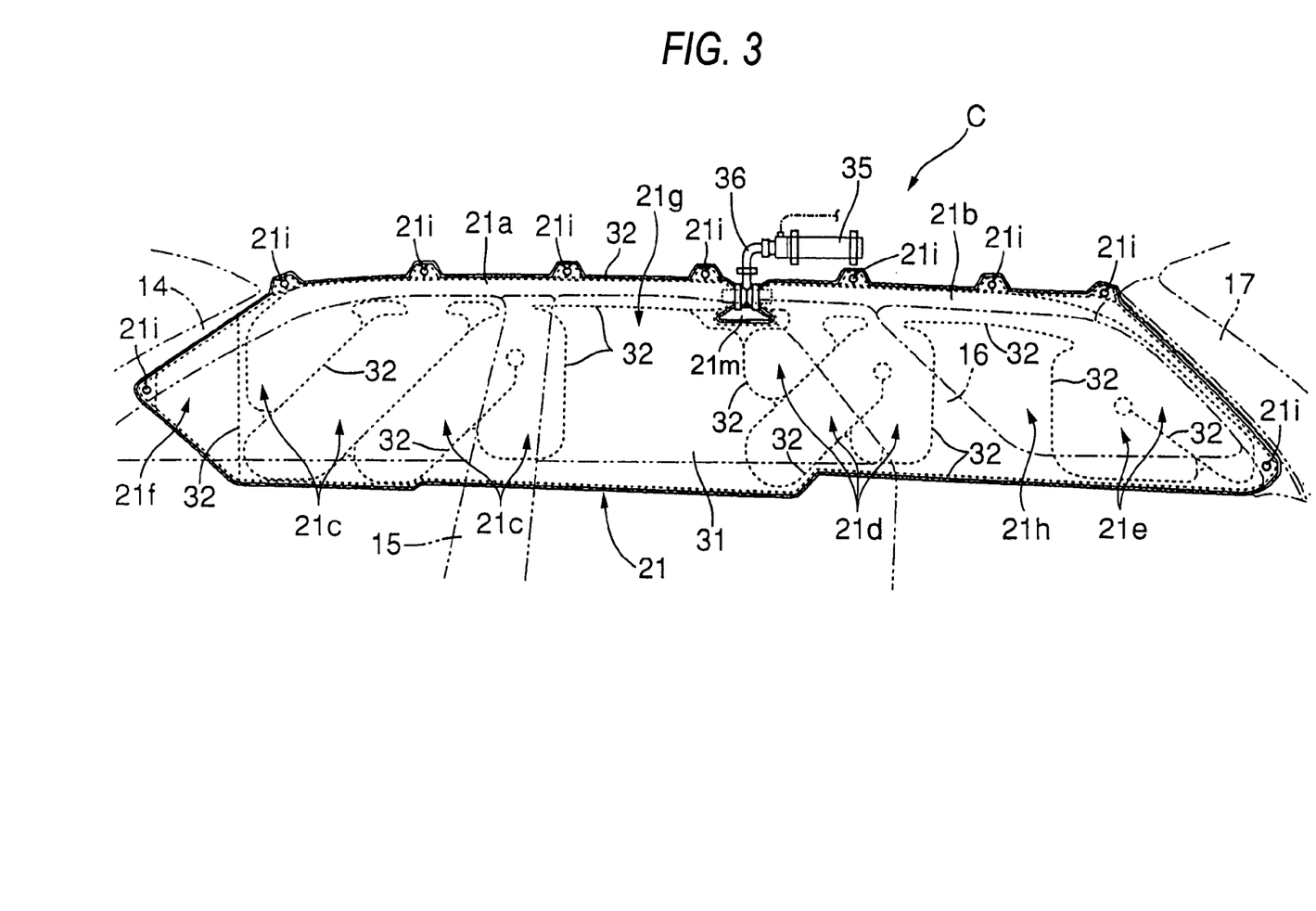
FIG. 3 is an enlarged view of a main part of FIG. 2.
Figure 4:
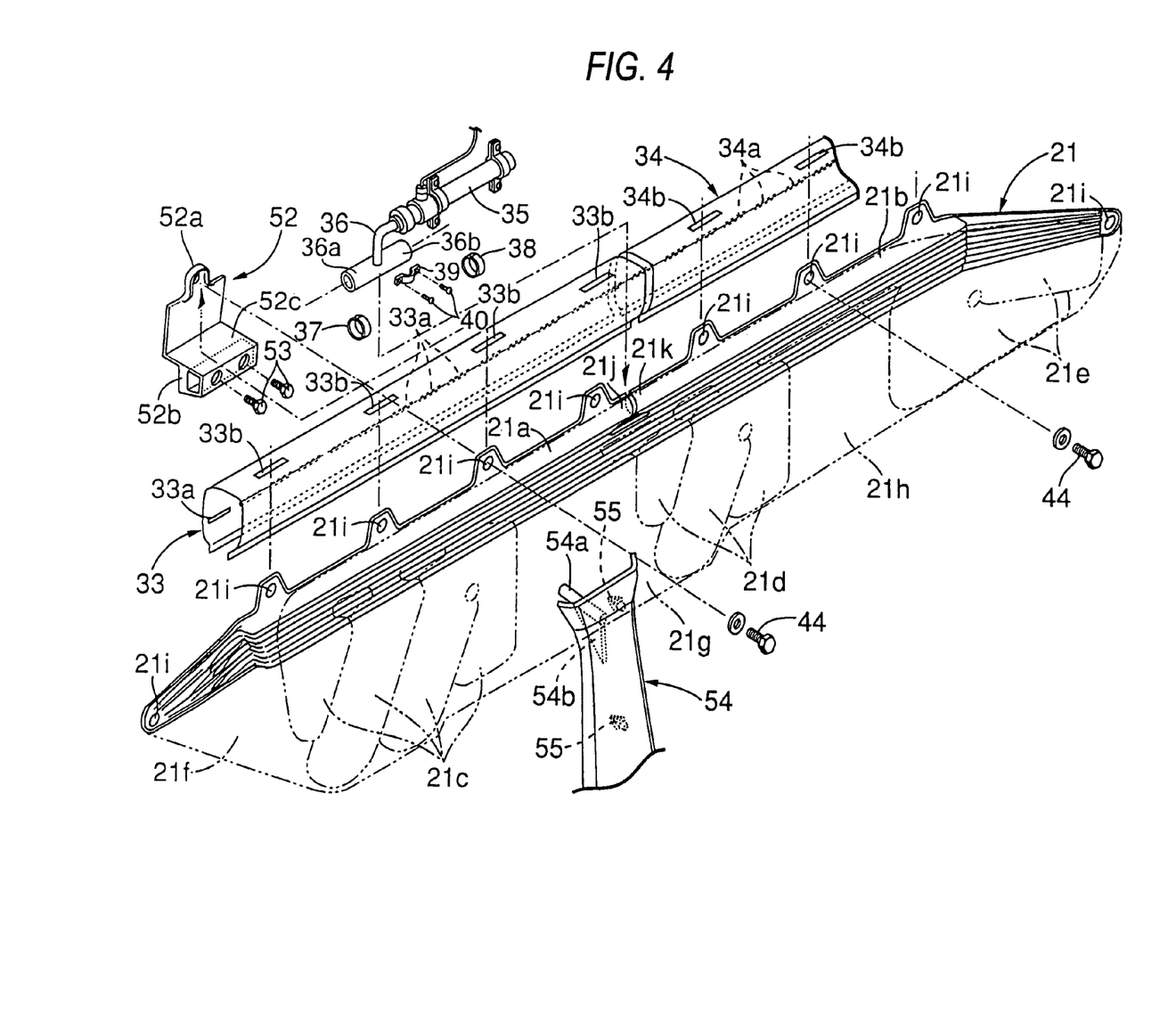
FIG. 4 is an exploded perspective view of an occupant restraint system.
Figure 5:
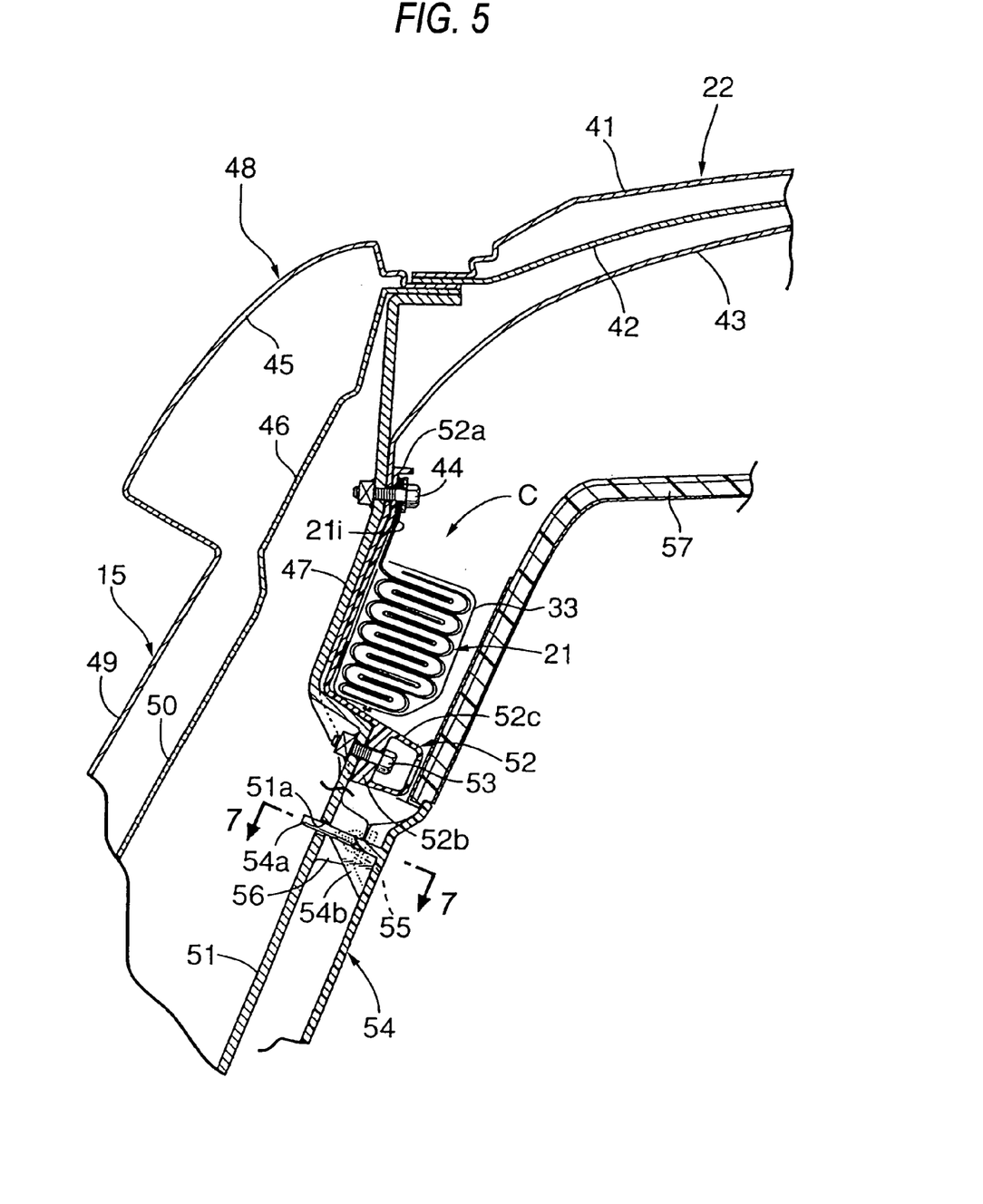
FIG. 5 is an enlarged cross-sectional view taken along the line 5—5 in FIG. 1.
Figure 6:
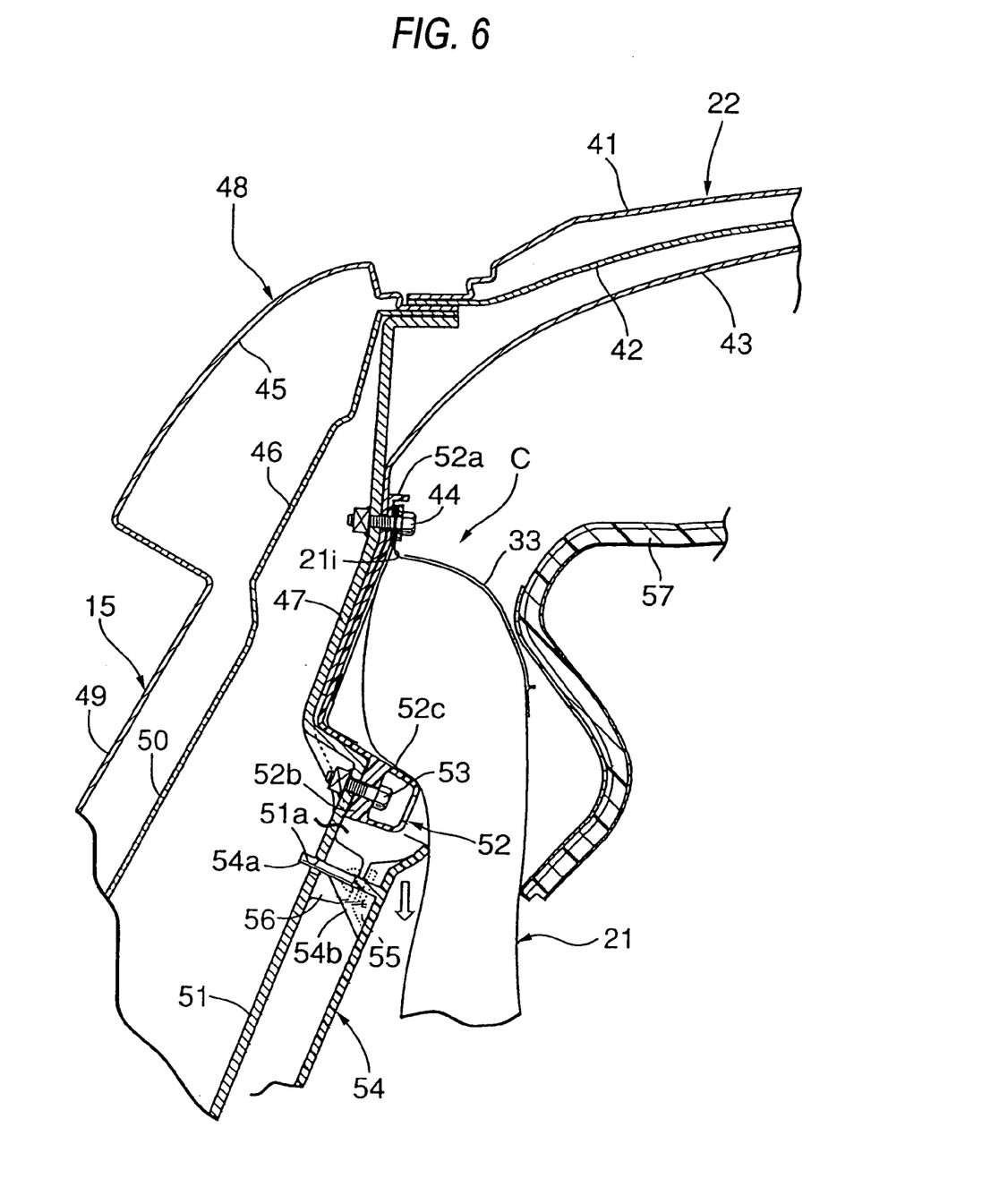
FIG. 6 is an enlarged cross-sectional view taken along the line 6—6 in FIG. 2.
Figure 7:
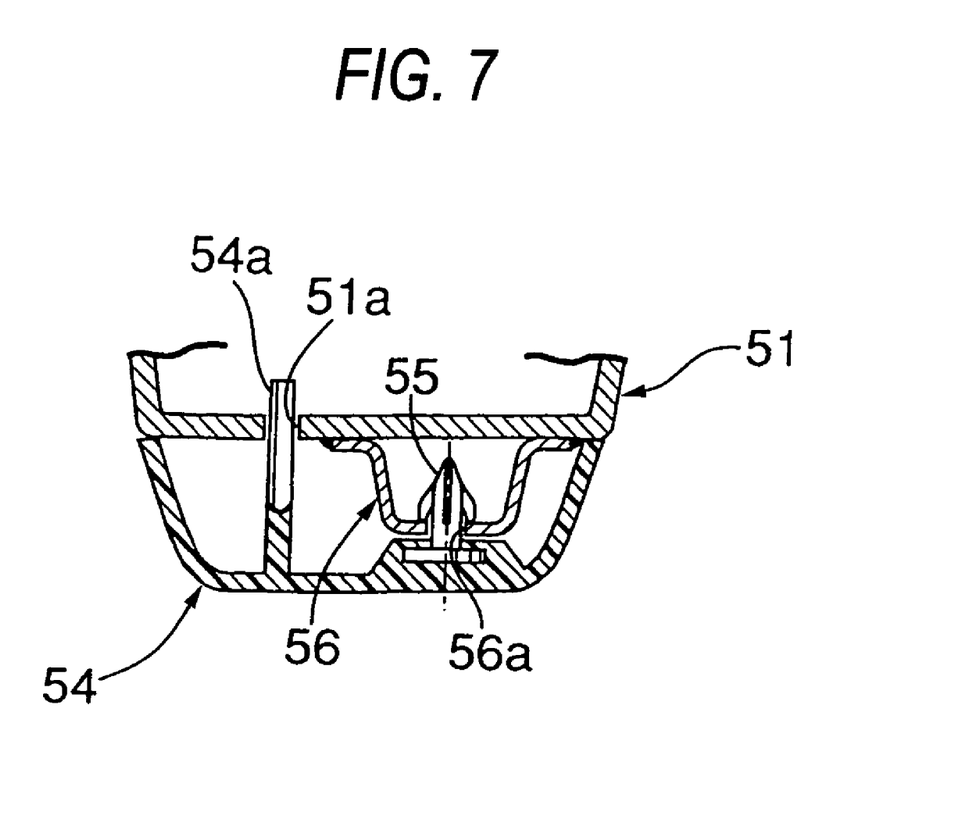
FIG. 7 is a cross-sectional view taken along the line 7—7 in FIG. 5.

FIGS. 1 to 7 show an embodiment of the invention, in which FIG. 1 is a drawing showing an inside of a passenger compartment of a vehicle when an air bag is in a non-deployed state, FIG. 2 is a drawing showing the inside of the passenger compartment of the vehicle when the air bag has been deployed, FIG. 3 is an enlarged view of a main part of FIG. 2, FIG. 4 is an exploded perspective view of an occupant restraint system, FIG. 5 is an enlarged cross-sectional view taken along the line 5—5 in FIG. 1, FIG. 6 is an enlarged cross-sectional view taken along the line 6—6 in FIG. 2, and FIG. 7 is a cross-sectional view taken along the line 7—7 in FIG. 5.

As shown in FIG. 1, a recreational vehicle or RV has a front-row seat 11, a center-row seat 12 and a rear-row seat 13. The RV also has A pillars 14, B pillars 15, C pillars 16 and D pillars 17. A front side door 18 is disposed between the A pillar 14 and the B pillar 15, a rear side door 19 is disposed between the B pillar 15 and the C pillar 16, and a tailgate 20 is disposed rearward of the D pillar 17. An air bag 21, which is folded, of an occupant restraint system C is accommodated so as to extend in a longitudinal direction of a vehicle body along a side portion of a roof 22 defined between the A pillar 14 and the D pillar 17. Note that while occupant restraint systems C having substantially the same construction are provided on both sides of the vehicle body, an occupant restraint system provided on the right-hand side of the vehicle body will be described below as representing the systems so provided.

As is clear from FIGS. 2 to 4, the airbag 21 is constructed by sewing 32 . . . a double-layered fabric base 31 and includes front and rear gas distribution passage ways 21a, 21b which extend longitudinally along an upper edge of the air bag 21. The air bag 21 also includes a plurality of cells 21c . . . which are branched to descend from the front gas distribution passageway 21a for protecting the head of an occupant on the front-row seat 11, a plurality of cells 21d . . . which are branched to descend from the rear gas distribution passageway 21b for protecting the head of an occupant on the center-row seat 12 and a plurality of cells 21e . . . which are branched to descend from the rear gas distribution passageway 21b for protecting the head of an occupant on the rear-row seat 13.

A non-deployable portion 21f to which no gas is supplied is formed ahead of the cells 21c . . . for the occupant on the front-row seat 11, a non-deployable portion 21g to which no gas is supplied is formed between the cells 21c . . . for the occupant on the front-row seat 11 and the cells 21d . . . for the occupant on the center-row seat 12, and a non-deployable portion 21h to which no gas is supplied is formed between the cells 21d . . . for the occupant on the center-row seat 12 and the cells 21e . . . for the occupant on the rear-row seat 13. Then, a plurality of attaching portions 21i . . . formed along the upper edge of the air bag 21 are fixed to the roof 22, the A pillar 14 and the D pillar 17.

The folded air bag 21 is encompassed by fabric covers 33, 34 which are divided longitudinally. The respective covers 33, 34 are sewn along lower edges thereof and are then formed into a cylindrical configuration, and the deployment of the air bag 21 is made possible when the covers 33, 34 break at stitch-like breakable portions 33a . . . , 34a . . . which are formed along the lengths of the covers 33, 34. The plurality of attaching portions 21i . . . formed along the upper edge of the air bag 21 are allowed to protrude upwardly through openings 33b . . . , 34b . . . which are formed in upper sides of the covers 33, 34.

As is clear from FIGS. 3 and 4, an inflator 35 is disposed on the side portion of the roof 22 at a position which faces an upper end of the C pillar 16. A gas supply pipe 36 which extends forward from an end portion of the inflator 35 is bent downwardly and is then branched into a longitudinal fork. A gas injection port 36a at a front end of the forked gas supply pipe 36 is inserted into a front gas supply port 21j at a rear end of the front gas distribution passageway 21a and is then fixed in place with a fixing band 37. A gas injection port 36b at a rear end of the forked gas supply pipe 36 is then inserted into a rear gas supply port 21k at a front end of the rear gas distribution passageway 21b and is then fixed in place with a fixing band 38. As this occurs, the fabric base 31 is cut out in a trapezoidal shape to form an opening 21m below the front and rear gas supply ports 21j, 21k in order to avoid interferences with the fixing bands 37, 38. The gas supply pipe 36 is fixed to the vehicle body with a fixing member 39 and bolts 40, 40.

As is clear from FIGS. 5 and 7, the roof 22 includes a roof outer 41, a stiffener 42 and a roof inner 43, and attaching portions 21i . . . of the air bag 21 are fixed to a roof inner 43 with bolts 44 . . . . A roof side rail 48 includes a roof side rail outer 45, a stiffener 46 and a roof side rain inner 47. The B pillar 15 connected to a lower end of the roof side rail 48 includes a pillar outer 49, a stiffener 50 and a pillar inner 51. A synthetic resin bracket 52 is mounted so as to extend between the roof side rail inner 47 and the pillar inner 51.

In the bracket 52, an attaching portion 52a provided at an upper end thereof is fixed with the bolt 44 in a state in which the attaching portion 52a overlaps the roof inner 43 and the roof side rail inner 47, and an attaching portion 52b provided at a lower end thereof is fixed to the pillar inner 51 with bolts 53, 53. A hollow guide portion 52c is integrally formed on the bracket 52 at a lower end portion thereof in such a manner as to protrude toward a passenger compartment side, and an upper surface of the guide portion 52c faces a lower end of the folded air bag 21. The guide portion 52c of the bracket 52 exhibits a function to deflect a deployment direction of the air bag 21 when the air bag 21 is deployed toward the passenger compartment side.

A plurality of clips 55 . . . are provided on an inner surface of a pillar garnish 54 which covers a side of the pillar inner 51 which faces the passenger compartment side, and the pillar garnish 54 is fixed to the pillar inner 51 by allowing these clips 55 . . . to be locked in openings 56a . . . formed in brackets 56 welded to the pillar inner 51. As this occurs, a rod-like projection 54a provided on the inner surface of the pillar garnish 54 in such a manner as to project therefrom is inserted into a hole 51a formed in the pillar inner 51. A root of the projection 54a is reinforced by a triangular reinforcing portion 54b and the rigidity of the projection 54a is increased. Then, a lower edge of a roof garnish 57 is held between a top surface of the guide portion 52c of the bracket 52 and the inner surface of the pillar garnish 54 at the upper end thereof to be fixed in place thereat. Note that the clips 55 . . . may be directly locked in the pillar inner 51 without using the brackets 56. Also note that the distal end of the projection 54a fits loosely in the hole 51a formed in the pillar inner.

Next, the function of the embodiment of the invention that is constructed as has been described heretofore will be described below.

When a side collision or a roll-over of the vehicle is detected by an acceleration sensor, the inflator 35 is activated by a command from an electronic control unit, and a gas stored in the inflator 35 is supplied into longitudinal gas distribution passageways 21a, 21b of the air bag 21 via a gas supply pipe 36 and flows therefrom into respective cells 21c . . . , 21d . . . , 21e . . . As a result, the air bag 21 accommodated in the folded state in such a manner as to extend along the side portion of the roof 22 is then inflated, and pushing downwardly the roof garnish 57 by virtue of the pressure thereof, the air bag 21 is deployed downwardly into the passenger compartment through an opening formed. The front-end cells 21c . . . of the air bag 21 so deployed protect the head of an occupant on a front-row seat 11, the central cells 21d . . . protect the head of an occupant on a center-row seat 12, and the rear-end cells 21e . . . protect the head of an occupant on a rear-row seat 13.

When the air bag 21 is inflated to push downwardly the roof garnish 57, the upper end of the pillar garnish 54 of the B pillar 15 which engages with the lower edge of the roof garnish 57 is also pushed downwardly. Then, in case the air-bag 21 is caught at the upper end of the pillar garnish 54 when the air bag 21 is deployed through the opening formed between the roof garnish 57 and the pillar garnish 54, the pillar garnish is subjected to a stronger downward load. When the pillar garnish 54 is subjected to the heavy load like this, the clips 55 . . . are dislocated from the openings 56a . . . in the brackets 56 . . . , and the pillar garnish 54 is caused to come off the pillar inner 51, this causing a risk that the smooth deployment of the air bag 21 is prevented.

According to the embodiment of the invention, however, since the projection 54a is provided on the inner surface of the pillar garnish 54 at the upper portion thereof in such a manner as to project therefrom is inserted into the hole 51a formed in the pillar inner 51, the dislocation of the pillar garnish 54 can be prevented against the load. Moreover, since the projection 54a is linear like a rod, the construction of a mold for molding the pillar garnish 54 does not have to be complex, and the molding of the pillar garnish 54 can be attained at extremely low costs. In addition, since the projection 54*a* is integrally formed with the pillar garnish 54, the number of components does not have to be increased, and since the projection 54*a* only has to be inserted at the distal end thereof into the hole 51*a* in the pillar inner 51, the assembly thereof is also facilitated.

Thus, while the embodiment of the invention has been 15, described in detail heretofore, the invention can be modified variously with respect to the design thereof without departing from the spirit and scope thereof.

For example, while the invention is applied to the B pillar 15 in the embodiment, the invention can be applied to a C pillar 13. In addition, the number of projections 54*a* is not limited to one, but a plurality of projections 54*a* may be provided.

Thus, according to the first aspect of the invention, even in case the air bag is caught at the upper end of the pillar garnish which covers the pillar when the air bag which is arranged in such a manner as to extend along the side portion of the roof in the folded state is inflated so as to be deployed along the side of the pillar which faces the passenger compartment, by causing the distal end of the projection integrally formed on the inner surface of the pillar garnish to be inserted in the hole formed in the pillar, the dislocation of the pillar garnish from the pillar is prevented to thereby enable the smooth deployment of the air bag. In addition, since the rod-like projection is formed into the simple shape when compared with the clip or hook, the projection is easy to be molded, whereby an increase in the production costs of the pillar garnish can be suppressed to a minimum level, and moreover, since no special member is required, there is caused no risk that the number of components is increased.

What is claimed is:

1. An occupant restraint system comprising:
    an air bag in a folded state being arranged in such a manner as to extend along a side portion of a roof, the air bag being inflated with a gas generated by an inflator so as to be deployed in a curtain-like fashion along an inner surface of a side portion of a passenger compartment when a vehicle is involved in a collision; and
    a pillar garnish covering a side of a pillar continuously extending downwardly from the side portion of the roof which faces the passenger compartment, the pillar garnish including a rod shaped projection which is formed on an inner surface of the pillar garnish,
    the projection having a distal end adapted to be inserted in a hole formed in the pillar and wherein the projection is linear and comprises a cross-sectional shape which is uniform in both size and shape along the length of the projection.

2. An occupant restraint system according to claim 1, wherein the projection is integrally formed on the inner surface of the pillar garnish.

3. An occupant restraint system according to claim 2, wherein the pillar garnish includes a triangular reinforcing portion for reinforcing a root of the projection.

4. An occupant restraint system according to claim 1, wherein the pillar garnish includes a triangular reinforcing portion for reinforcing a root of the projection.

5. An occupant restraint system according to claim 1, further comprising a clip which secures the pillar garnish to the pillar.

6. An occupant restraint system according to claim 5, wherein said projection is disposed adjacent to said clip.

7. An occupant restraint system according to claim 6, wherein the clip and the projection are oriented in the same direction.

8. An occupant restraint system according to claim 5, wherein said projection and said clip are provided at an upper portion of said pillar garnish.

9. An occupant restraint system according to claim 5, wherein said clip dislocates from said pillar when said air bag is deployed.

10. An occupant restraint system according to claim 1, wherein said distal end of said projection is adapted to be loosely disposed in said hole formed in the pillar.

11. An occupant restraint system according to claim 1, wherein said projection is molded integrally with said pillar garnish.

* * * * *